United States Patent
Kim et al.

(10) Patent No.: US 10,362,606 B2
(45) Date of Patent: Jul. 23, 2019

(54) RESOURCE ALLOCATION FOR UPLINK MULTI-USER TRANSMISSION IN WLAN

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/491,912

(22) Filed: Apr. 19, 2017

(65) Prior Publication Data

US 2017/0311289 A1    Oct. 26, 2017

Related U.S. Application Data

(60) Provisional application No. 62/324,900, filed on Apr. 20, 2016.

(51) Int. Cl.
*H04W 72/04* (2009.01)
*H04W 74/08* (2009.01)
*H04W 72/12* (2009.01)
*H04L 5/00* (2006.01)
*H04W 84/12* (2009.01)

(52) U.S. Cl.
CPC ....... *H04W 74/0816* (2013.01); *H04L 5/0044* (2013.01); *H04L 5/0091* (2013.01); *H04W 72/1268* (2013.01); *H04W 84/12* (2013.01)

(58) Field of Classification Search
CPC combination set(s) only.
See application file for complete search history.

(56) References Cited

U.S. PATENT DOCUMENTS

| | | | |
|---|---|---|---|
| 2016/0100408 A1* | 4/2016 | Hedayat | H04L 65/4076 370/329 |
| 2016/0128057 A1* | 5/2016 | Seok | H04L 5/0055 370/329 |
| 2016/0330715 A1* | 11/2016 | Chen | H04L 27/2607 |
| 2016/0353322 A1* | 12/2016 | Li | H04L 5/00 |
| 2017/0041171 A1* | 2/2017 | Li | H04L 5/0044 |

* cited by examiner

*Primary Examiner* — Walli Z Butt
(74) *Attorney, Agent, or Firm* — Lee, Hong, Degerman, Kang & Waimey

(57) ABSTRACT

Improved uplink multi-user (UL MU) resource allocation is proposed. For the UL MU scheduling information of trigger frame, N (N>1) bits indicate allocated resource unit (RU) in unit of 26-tone RU, 52-tone RU, 106-tone RU, 242-tone RU, 484-tone RU and 996-tone RU in 80 MHz, and indicates the allocated RU in 80+80 MHz. The UL MU scheduling information of a multi-user request-to-send (MU-RTS) frame indicates an allocated channel corresponding to '242*M'-tone RU with a same bit pattern as the N bits of the first UL MU scheduling information, wherein 'M' is an integer greater than 0.

12 Claims, 11 Drawing Sheets

FIG. 6

| Length | Cascade Indication | CS Required | HE-SIG-A Info | CP and LTF Type | Trigger Type | Trigger-dependent Common Info |
|---|---|---|---|---|---|---|
| 12 | 1 | 1 | TBD | TBD | TBD | variable |

Bits:

FIG. 7

| User Indentifier | RU Allocation | Coding Type | MCS | DCM | SS Allocation | Trigger dependent Per User Info |
|---|---|---|---|---|---|---|
| 12 | TBD | TBD | TBD | TBD | TBD | variable |

Bits:

RESOURCE ALLOCATION FOR UPLINK MULTI-USER TRANSMISSION IN WLAN

CROSS-REFERENCE TO RELATED APPLICATIONS

Pursuant to 35 U.S.C. § 119(e), this application claims the benefit of U.S. Provisional Patent Application No. 62/324,900, filed on Apr. 20, 2016, the contents of which are hereby incorporated by reference herein in its entirety.

BACKGROUND OF THE INVENTION

Field of the Invention

The present invention relates to a method and apparatus for improved resource allocation for uplink multi-user (UL MU) transmission in HE (High Efficiency) WLAN (Wireless Local Area Network).

Discussion of the Related Art

Standards for WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

The station (STA) capable of supporting IEEE 802.11n is officially called as HT (High Throughput) STA. The STA capable of supporting IEEE 802.11ac is officially called as VHT (Very High Throughput) STA. And, the STA capable of supporting IEEE 802.11ax is officially called as HE (High Efficiency) STA.

In the HE system, there are needs for uplink multi-user (UL MU) transmission for various purposes. For example, a trigger frame is introduced to solicit UL MU transmission from multiple STAs. UL MU transmission based on the trigger frame can be based on OFDMA (Orthogonal Frequency Domain Multiple Access) scheme. Also, RTS (Request-to-send) frame can be transmitted for soliciting simultaneous CTS (Clear-to-send) frames from multiple STAs. But, the simultaneous RTS frames would be transmitted in a unit of (sub-) channel corresponding to 20 MHz.

Thus, efficient resource allocation scheme is required considering these various conditions for UL MU transmissions.

SUMMARY OF THE INVENTION

To achieve these objects and other advantages and in accordance with the purpose of the invention, as embodied and broadly described herein, a method for an AP (Access Point) to allocate radio resource to multiple STAs (stations) for uplink (UL) transmission in a wireless local area network (WLAN), the method comprising: transmitting a trigger frame including first uplink multi-user (UL MU) scheduling information, wherein the first UL MU scheduling information includes N (N>1) bits indicating allocated resource unit (RU) in unit of 26-tone RU, 52-tone RU, 106-tone RU, 242-tone RU, 484-tone RU and 996-tone RU in 80 MHz, and indicates the allocated RU in 80+80 MHz; receiving one or more trigger-based PPDUs (Physical Protocol Data Units) based on the first UL MU scheduling information; transmitting a multi-user request-to-send (MU-RTS) frame including second UL MU scheduling information, wherein the second UL MU scheduling information indicates an allocated channel corresponding to '242*M'-tone RU with a same bit pattern as the N bits of the first UL MU scheduling information, wherein 'M' is an integer greater than 0; and receiving one or more clear to send (CTS) frames based on the second UL MU scheduling information, is proposed.

The MU-RTS may be transmitted to the multiple STAs soliciting simultaneous CTS frames from the multiple STAs.

The second UL MU scheduling information may indicate the allocated channel corresponding to '242*M'-tone RU with the same bit pattern as the N bits of the first UL MU scheduling information allocates the allocated RU equal to or greater than 242-tone RU.

The first UL MU scheduling information may include a first bit indicating whether allocated resource unit (RU) is located in a primary 80 MHz or non-primary 80 MHz, and the N bits subsequent to the first bit.

A length of the N bits of the first UL MU scheduling information may be 7 bits.

The second UL MU scheduling information may indicate 4 different allocated channels corresponding to 242-tone RU with the same bit pattern as the N bits of the first UL MU scheduling information.

The second UL MU scheduling information may indicate 2 different allocated channels corresponding to 484-tone RU with the same bit pattern as the N bits of the first UL MU scheduling information.

The second UL MU scheduling information may further indicate a location of a primary channel in a frequency domain.

The first and the second UL MU scheduling information may be included in user-information fields of the trigger frame and the MU-RTS frame, respectively.

In another aspect of the present invention, a method for a STA (station) to transmit uplink multi-user (UL MU) signal to an access point (AP) in a wireless local area network (WLAN), the method comprising: receiving a trigger frame including first UL MU scheduling information, wherein the first UL MU scheduling information includes N (N>1) bits indicating allocated resource unit (RU) in unit of 26-tone RU, 52-tone RU, 106-tone RU, 242-tone RU, 484-tone RU and 996-tone RU in 80 MHz, and indicates the allocated RU in 80+80 MHz; transmitting a trigger-based PPDU (Physical Protocol Data Unit) based on the first UL MU scheduling information; receiving a multi-user request-to-send (MU-RTS) frame including second UL MU scheduling information, wherein the second UL MU scheduling information indicates an allocated channel corresponding to '242*M'-tone RU with a same bit pattern as the N bits of the first UL MU scheduling information, wherein 'M' is an integer greater than 0; and transmitting a clear to send (CTS) frame based on the second UL MU scheduling information, is proposed.

In still another aspect of the present invention, an AP (Access Point) allocating radio resource to multiple STAs (stations) for uplink (UL) transmission in a wireless local area network (WLAN), the AP comprising: a transceiver configured to transmit a trigger frame including first uplink multi-user (UL MU) scheduling information and a multi-user request-to-send (MU-RTS) frame including second UL MU scheduling information to the STAs, and to receive one or more trigger-based PPDUs (Physical Protocol Data Units) based on the first UL MU scheduling information and one or more clear to send (CTS) frames based on the second UL MU scheduling information from the STAs; and a processor configured to prepare the first and the second UL MU scheduling information, wherein the first UL MU scheduling information includes N (N>1) bits indicating allocated resource unit (RU) in unit of 26-tone RU, 52-tone RU, 106-tone RU, 242-tone RU, 484-tone RU and 996-tone RU in 80 MHz, and indicates the allocated RU in 80+80 MHz, wherein the second UL MU scheduling information indicates an allocated channel corresponding to '242*M'-tone RU with a same bit pattern as the N bits of the first UL MU scheduling information, and wherein 'M' is an integer greater than 0, is proposed.

In still another aspect of the present invention, a STA (station) transmitting uplink multi-user (UL MU) signal to an access point (AP) in a wireless local area network (WLAN), the STA comprising: a transceiver configured to receive a trigger frame including first uplink multi-user (UL MU) scheduling information and a multi-user request-to-send (MU-RTS) frame including second UL MU scheduling information from the AP, and to transmit a trigger-based PPDU (Physical Protocol Data Unit) based on the first UL MU scheduling information and a clear to send (CTS) frame based on the second UL MU scheduling information from the STAs; and a processor configured to process the first and the second UL MU scheduling information, wherein the first UL MU scheduling information includes N (N>1) bits indicating allocated resource unit (RU) in unit of 26-tone RU, 52-tone RU, 106-tone RU, 242-tone RU, 484-tone RU and 996-tone RU in 80 MHz, and indicates the allocated RU in 80+80 MHz, wherein the second UL MU scheduling information indicates an allocated channel corresponding to '242*M'-tone RU with a same bit pattern as the N bits of the first UL MU scheduling information, and wherein 'M' is an integer greater than 0, is proposed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

In FIG. 3, an exemplary infrastructure BSS including a DS is illustrated.

FIG. 6 shows one exemplary format of common information field of trigger frame according to one embodiment of the present invention.

FIG. 7 shows one exemplary format of per user Info field of the trigger frame according to one embodiment of the present invention.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description is given for efficient resource allocation scheme considering various conditions for UL MU transmissions in HE WLAN. For this purpose, a WLAN system to which the present invention is applied will first be described.

Figure 1:
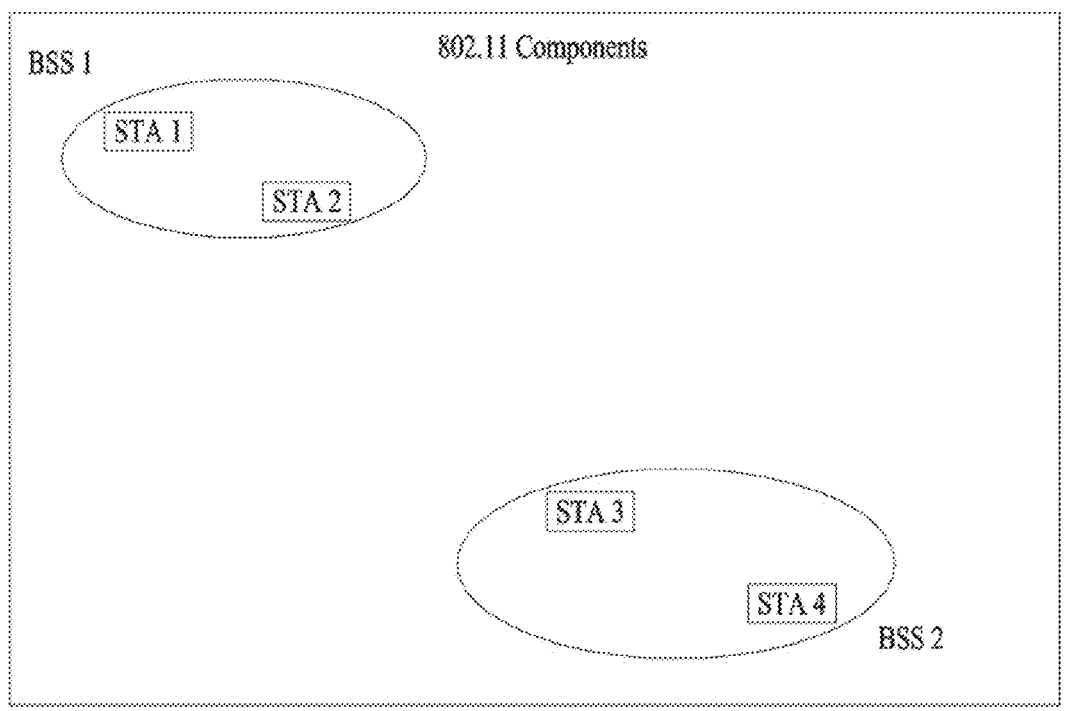
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS 5).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
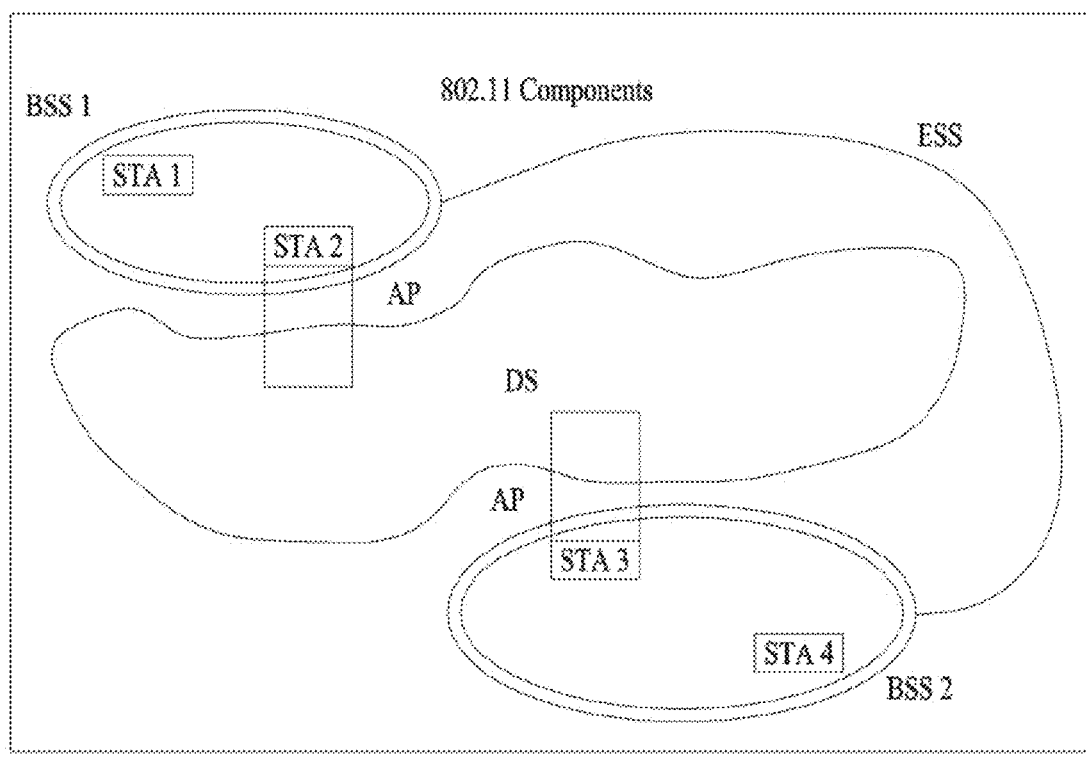
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
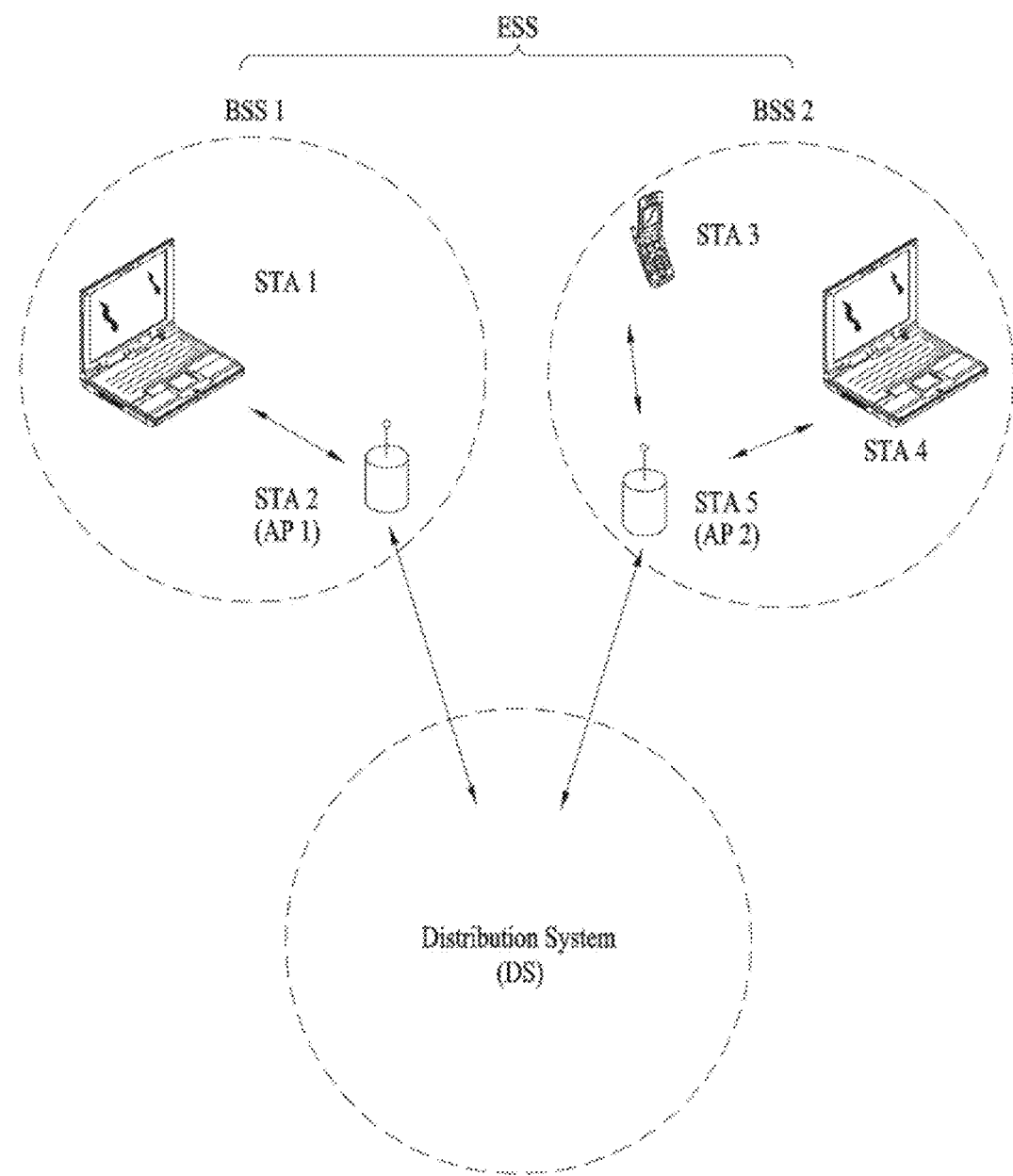
FIG. 3 illustrates an exemplary configuration of a WLAN system.

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Various UL MU transmission schemes in HE WLAN are explained as following.

Trigger Frame Based UL MU Transmission

Figure 4:
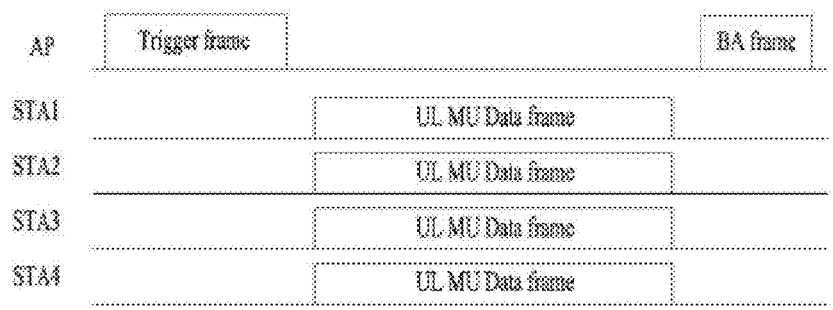
FIG. 4 is a view illustrating uplink multi-user (UL MU) transmission applicable to the present disclosure.

FIG. 4 is a view illustrating uplink multi-user (UL MU) transmission applicable to the present disclosure.

The AP may acquire a TXOP to access a medium, and transmit a signal by occupying the medium through contention. Referring to FIG. 4, the AP STA may transmit a trigger frame to a plurality of STAs to perform UL MU transmission. In this case, the trigger frame may include, for example, information about a resource allocation position and size, IDs of the STAs, MCS, and MU type (=MIMO, OFDMA) as UL MU allocation information. That is, the trigger frame transmitted by the AP STA to the plurality of STAs may be a frame allowing the plurality of STAs to perform UL data transmissions.

The plurality of STAs may transmit data to the AP after an SIFS elapses based on a format indicated by the trigger frame. The AP may then send ACK/NACK information to the STAs, and thus the STAs may perform UL MU transmissions.

As stated above, the Trigger frame is used to allocate resource for UL MU transmission and to solicit an UL MU transmission at specific time after the PPDU that carries the Trigger frame. The Trigger frame also carries other information required by the responding STA to send UL MU.

Figure 5:
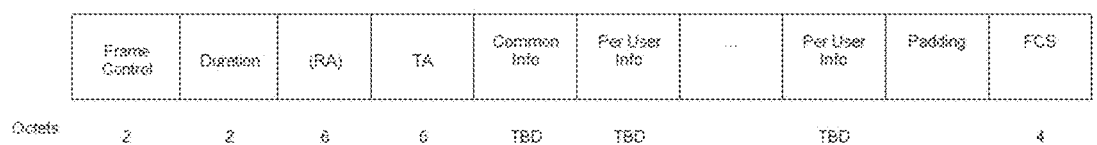
FIG. 5 shows one exemplary format of trigger frame according to one embodiment of the present invention.

FIG. 5 shows one exemplary format of trigger frame according to one embodiment of the present invention.

The Duration/ID field is set as Duration/ID field for QoS STA. The RA field of the Trigger frame is the address of the recipient STA. Whether RA is not part of Trigger frame is to be determined soon. The TA field value is the address of the STA transmitting the Trigger frame.

FIG. 6 shows one exemplary format of common information field of trigger frame according to one embodiment of the present invention.

The Length subfield of the Common Info field indicates the value of the L-SIG Length field of the HE trigger-based PPDU that is the response to the Trigger frame. If the Cascade Indication subfield is 1, then a subsequent Trigger frame follows the current Trigger frame. Otherwise the Cascade Indication subfield is 0. The CS Required subfield is set to 1 to indicate that the STAs identified in the Per User Info fields are required to use ED to sense the medium and to consider the medium state and the NAV in determining whether or not to respond. The CS Required subfield is set to 0 to indicate that the STAs identified in the Per User Info fields are not required consider the medium state or the NAV in determining whether or not to respond.

The HE-SIG-A Info subfield of the Common Info field indicates the content of the HE-SIG-A field of the HE trigger-based PPDU response. The TBD bits in HE-SIG-A of the HE trigger-based PPDU that may be implicitly known by all responding STAs can be excluded.

The CP and LTF Type subfield of the Common Info field indicates the CP and HE-LTF type of the HE trigger-based PPDU response. The CP and LTF field encoding is defined in Table 1.

TABLE 1

| CP and LTF field value | Description |
| --- | --- |
| 0 | 2x LTF + 0.8 μs CP |
| 1 | 2x LTF + 1.6 μs CP |
| 2 | 4x LTF + 3.2 μs CP |
| 3-TBD | Reserved |

The Trigger Type subfield indicates the type of the Trigger frame. The Trigger frame can include an optional type-specific Common Info and optional type-specific Per User Info. Table 2 defines the valid Trigger Type.

TABLE 2

| Trigger Type value | Trigger Type description |
| --- | --- |
| 0 | Basic Trigger |
| 1 | Beamforming Report Poll Trigger |
| 2 | MU-BAR |
| 3 | MU-RTS |
| 4-TBD | Reserved |

FIG. 7 shows one exemplary format of per user Info field of the trigger frame according to one embodiment of the present invention.

The User Identifier subfield of the Per User Info field indicates the AID of the STA allocated the RU to transmit the MPDU(s) in the HE trigger-based PPDU.

The RU Allocation subfield of the Per User Info field indicates the RU used by the HE trigger-based PPDU of the STA identified by User Identifier subfield.

The Coding Type subfield of the Per User Info field indicates the code type of the HE trigger-based PPDU response of the STA identified by User Identifier subfield. Set to 0 for BCC and set to 1 for LDPC.

The MCS subfield of the Per User Info field indicates the MCS of the HE trigger-based PPDU response of the STA identified by User Identifier field.

The DCM subfield of the Per User Info field indicates dual carrier modulation of the HE trigger-based PPDU response of the STA identified by User Identifier subfield. A value of 1 indicates that the HE trigger-based PPDU response shall use DCM. Set to 0 to indicate that DCM shall not be used.

The SS Allocation subfield of the Per User Info field indicates the spatial streams of the HE trigger-based PPDU response of the STA identified by User Identifier field. The Padding field extends the frame length to give the recipient STAs more time to prepare a response.

Figure 8:
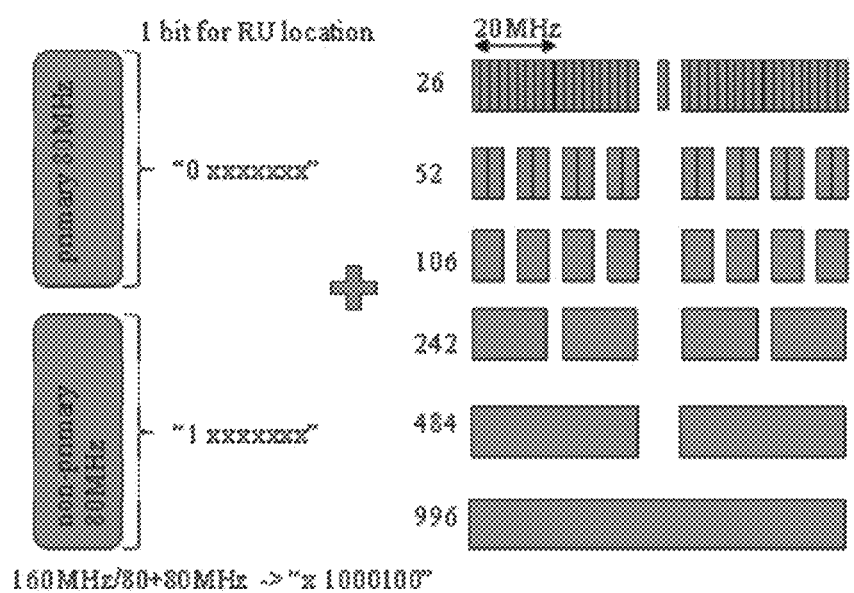
FIG. 8 is a diagram for explaining efficiently resource allocation scheme for UL MU transmission based on the trigger frame according to one embodiment of the present invention.

FIG. 8 is a diagram for explaining efficiently resource allocation scheme for UL MU transmission based on the trigger frame according to one embodiment of the present invention.

In order to efficiently allocate resource for UL MU transmission based on the above trigger frame, one embodiment of the present invention propose to use 8 bits to signal the RU allocation for each STA in per user info field of Trigger frame.

In one example, the first bit indicates the allocated RU is located in the primary or non-primary 80 MHz. FIG. 8 shows an example where "0" in the first bit indicate the allocated RU is located in primary 80 MHz, and "1" in the first bit indicate the allocated RU is located in non-primary 80 MHz.

The mapping of the subsequent 7 bits indices to the RU allocation can be defined in the table below.

TABLE 3

| 7 bits indices | Message | Number of entries |
|---|---|---|
| 0000000~0100100 | Possible 26 RU cases in 80 MHz | 37 |
| 0100101~0110100 | Possible 52 RU cases in 80 MHz | 16 |
| 0110101~0111100 | Possible 106 RU cases in 80 MHz | 8 |
| 0111101~1000000 | Possible 242 RU cases in 80 MHz | 4 |
| 1000001~1000010 | Possible 484 RU cases in 80 MHz | 2 |
| 1000011 | 996 RU cases in 80 MHz | 1 |
| 1000100 | 160 MHz/80 + 80 MHz case | 1 |
| Total |  | 69 |

As shown in FIG. 8 and Table 3 above, the UL MU scheduling information includes 7 bits indicating allocated RU in unit of 26-tone RU, 52-tone RU, 106-tone RU, 242-tone RU, 484-tone RU and 996-tone RU in 80 MHz, and indicates the allocated RU in 80+80 MHz.

In one preferred detailed example of the present invention, B12 is set to 0 for a 20 MHz, 40 MHz and 80 MHz PPDU. For the 2☐996-tone RU case, B12 is set to 1. The mapping of subsequent 7 bits indices B19-B13 to RU index in each row depends on the BW bits in Common Info field:

For a 20 MHz PPDU, the mapping of B19-B13 to RU allocation follows the RU index as subcarrier indices for RUs in a 20 MHz HE PPDU in an increasing order. B19-B13 are 0000000 indicates 26-tone RU1 [121: ☐96], 0001000 indicates 26-tone RU9 [96: 121], and 0001001-0100100 are not used. B19-B13 are 0100101 indicates 52-tone RU1 [121: ☐70], 0101000 indicates 52-tone RU4 [70: 121], and 0101001-0110100 are not used. B19-B13 are 0110101 indicates 106-tone RU1 [122: ☐17], 0110110 indicates 106-tone RU2 [17: 122], and 0110111-0111100 are not used. B19-B13 are 0111101 indicates 242-tone RU1 [122: ☐2, 2:122], and 0111110-1000000 are not used.

For a 40 MHz PPDU, the mapping of B19-B13 to RU allocation follows the RU index as subcarrier indices for RUs in a 40 MHz HE PPDU) in an increasing order. B19-B13 are 0000000 indicates 26-tone RU1 [243: ☐218], 0010001 indicates 26-tone RU18 [218: 243], and 0010010-0100100 are not used. B19-B13 are 0100101 indicates 52-tone RU1 [243: ☐192], 0101100 indicates 52-tone RU8 [192: 243], and 0101101-0110100 are not used. Similar ordering is followed for 106-tone RU, 242-tone RU and 484-tone RU. For example, B19-B13 are 0111101 indicates 242-tone RU1 [−244: −3], 0111110 indicates 242-tone RU2 [3: 244], 0111111 and 1000000 are not used. B19-B13 are 1000001 indicates 484-tone RU1 [−244: −3, 3: 244], 1000010 is not used.

For an 80 MHz, 160 MHz and 80+80 MHz PPDU, the mapping of B19-B13 to RU allocation follows the RU index as subcarrier indices for RUs in an 80 MHz HE PPDU in an increasing order. B19-B13 are 0000000 indicates 26-tone RU1 [499: ☐474], and 0100100 indicates 26-tone RU37 [474: 499]. B19-B13 are 0100101 indicates 52-tone RU1 [☐499: ☐448], and 0110100 indicates 52-tone RU16 [448: 499]. Similar ordering is followed for 106-tone RU, 242-tone RU, 484-tone RU and 996-tone RU. For a 160 MHz and 80+80 MHz PPDU, B19-B13 are 1000100 indicates 2☐996-tone RU.

For example, B19-B13 are 0111101 indicates 242-tone RU1 [−500: −259], 0111110 indicates 242-tone RU2 [−258: −17], 0111111 indicates 242-tone RU3 [17: 258], and 1000000 indicates 242-tone RU4 [259: 500]. B19-B13 are 1000001 indicates 484-tone RU1 [−500: −17], 1000010 indicates 484-tone RU2 [17: 500]. B19-B13 are 1000011 indicates 996-tone RU1 [−500: −3, 3: 500].

MU-RTS Based UL MU Transmission

In order to explain the MU-RTS based UL MU transmission, first, understanding on DCF mechanism and hidden node/exposed node problem would be efficient.

Figure 9:
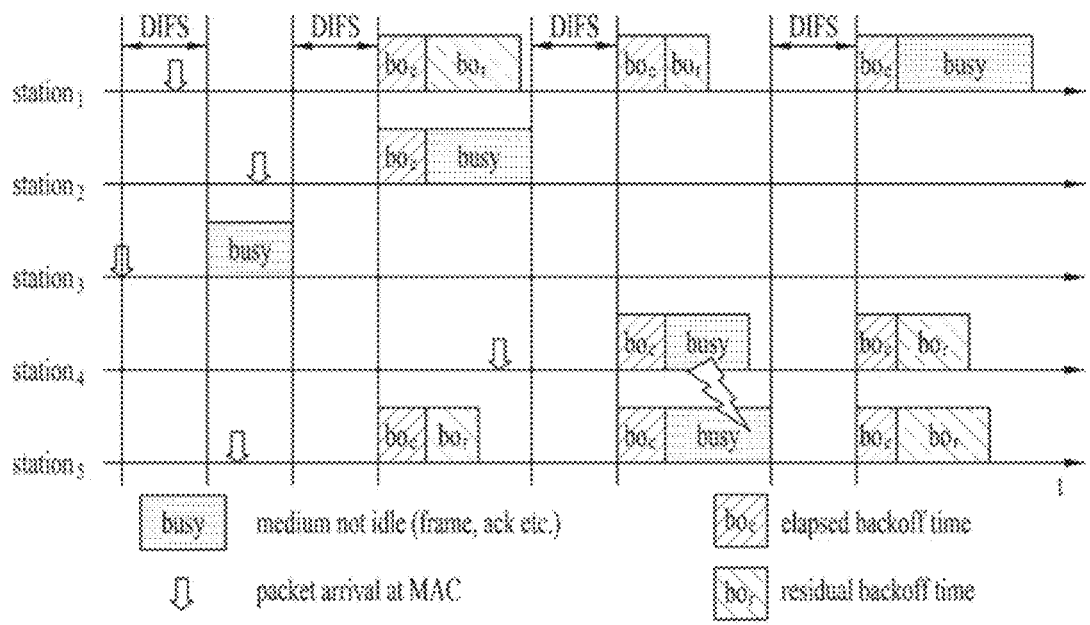
FIG. 9 is a diagram for describing the DCF mechanism in the WLAN system.

FIG. 9 is a diagram for describing the DCF mechanism in the WLAN system.

The DCF performs CCA (clear channel assessment) for sensing a medium during a specific period (e.g., DCF inter-frame space (DIFS)) before STAs having data to be transmitted transmit the data. In this case, if the medium is idle, an STA may transmit a signal using the idle medium. On the contrary, if the medium is busy, an STA may transfer data after waiting for a random backoff period in addition to the DIFS on the assumption that several STAs stand by in order to use the busy medium. In this case, the random backoff period allows STAs to avoid collisions with each other. In particular, assuming that there are a plurality of STAs that intend to transmit data, each of the STAs may have a different backoff period value stochastically. Accordingly, each of the STAs may have a different transmission time. If an STA initiates transmission using a medium, other STAs may not use the medium.

In the following description, a random backoff time and a random backoff procedure are briefly explained.

If a specific wireless medium is switched from a busy state to an idle state, a plurality of STAs start preparations for transferring data. In this case, in order to minimize collisions, each of the STAs that intend to transmit data selects a random backoff count and then stands by for a corresponding slot time. The random backoff count is a pseudo-random integer value and is determined as one of values uniformly distributed in the range of [0 CW]. The CW means a contention window.

Although a CW parameter has an initial value CWmin, this value may be doubled in case of transmission failure. For instance, when an STA fails in receiving ACK in response to a transmitted data frame, the STA may consider that a collision occurs. When a CW value reaches a maximum value CWmax, the CWmax value is maintained until data transmission is successfully performed. If the data transmission is successful, the CW value is reset to the CWmin value. In this case, for convenience of implementation and operation, it is preferable that CW, CWmin and CWmax are set to maintain $2^n-1$.

Meanwhile, if a random backoff procedure is initiated, an STA continuously monitors a medium during backoff slot countdown after selecting a random backoff count in the range of [0 CW]. During the countdown, if the medium enters a busy state, the STA stops the countdown and stands by. Thereafter, if the medium enters an idle state, the STA resumes the rest of backoff slot countdown.

Referring to FIG. 9, when there are a plurality of STAs that intend to transfer data, STA 3 transfers data immediately since a medium has been in the idle state for DIFS. However, the rest of STAs stand by until the medium enters the idle state. Since the medium has been in the busy state for a while, several STAs monitors the medium in order to use it and thus each of the STAs selects a random backoff count. FIG. 9 illustrates a case that STA 2, which selects a smallest backoff count, transmits a data frame.

After the STA 2 completes transmission, the medium is in the idle state again and then the STAs resume the stopped countdown with respect to backoff interval. In FIG. 9, having stopped the countdown for a while since the medium was in the busy state, STA 5 having a second smallest backoff count value (smaller than that of the STA 2) starts data frame transmission after performing the remaining backoff slot countdown. However, a collision occurs since it overlaps with a random backoff count value of STA 4 by chance. In this case, since both of the two STAs fail in receiving ACK response, they select random backoff count values again after doubling the CW.

As described above, the most basic of CSMA/CA is the carrier sensing. A terminal may use both physical carrier sensing and virtual carrier sensing in order to determine whether a DCF medium is in a busy state or an idle state. The physical carrier sensing is performed through energy detection or preamble detection in a physical layer (PHY). For instance, if a voltage level in a receiving end is measured or if it is determined that a preamble is read, the terminal may determine that the medium is in the busy state. The purpose of the virtual carrier sensing is to prohibit other STAs from transmitting data by configuring NAV (network allocation vector) and it is performed using a value of Duration field in a MAC header. Moreover, a robust collision detect mechanism has been introduced in order to reduce collision probability. The reason for the introduction can be checked through the following two examples. For convenience, the range of carrier sensing is assumed to be equal to that of transmission.

Figure 10:
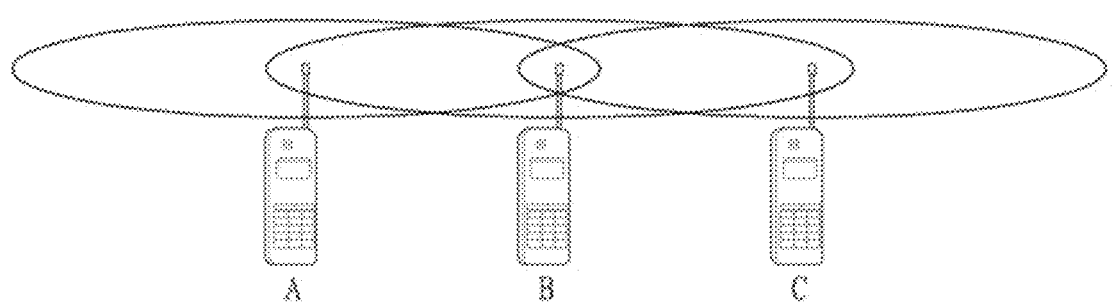
FIGS. 10 and 11 are diagrams for describing problems of the conventional collision resolution mechanism.
Figure 11:
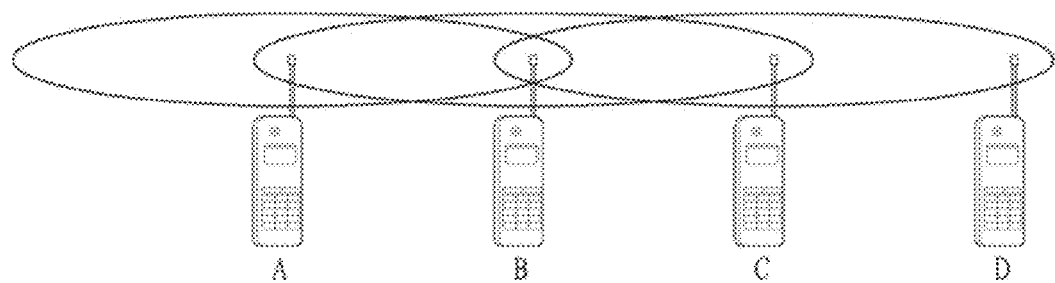

FIGS. 10 and 11 are diagrams for describing problems of the conventional collision resolution mechanism.

Specifically, FIG. 10 is a diagram for explaining hidden node issues. In the present example, STA A and STA B communicate with each other and STA C has information to be transmitted. In particular, although the STA A transmits information to the STA B, while performing the carrier sensing on a medium before transmitting data to the STA B, the STA C cannot detect signal transmission from the STA A since the STA C is out of transmission range of the STA A. As a result, the STA C may determine that the medium is in the idle state. In this case, the STA B simultaneously receives information form both of the STA A and STA C and thus a collision occurs. Here, the STA A can be regarded as a hidden node of the STA C.

On the other hand, FIG. 11 is a diagram for explaining exposed node issues. In FIG. 5, STA B transmits data to STA A. In this case, STA C performs the carrier sensing and then determine that a medium is in the busy state due to information transmitted from the STA B. As a result, even if the STA C intends to transmit data to STA D, since the medium is sensed as busy, the STA C needs to stand by unnecessarily until the medium becomes idle. In other words, even though the STA A is out of the CS range of the STA C, the STA A may prevent the STA C from transmitting information. Here, the STA C can be regarded as an exposed node of the STAB.

To efficiently use a collision avoidance mechanism in the above-mentioned situations, a short signaling packet such as RTS (request to send), CTS (clear to send) or the like can be introduced. According to the short signaling packet, neighboring STAs may overhear whether information is transmitted between two STAs. In other words, if an STA that intends to transmit data transmits an RTS frame to an STA that will receive the data, the receiving STA can notify neighboring STAs that it will receive the data in a manner of transmitting a CRS frame to the neighboring STAs.

Figure 12:
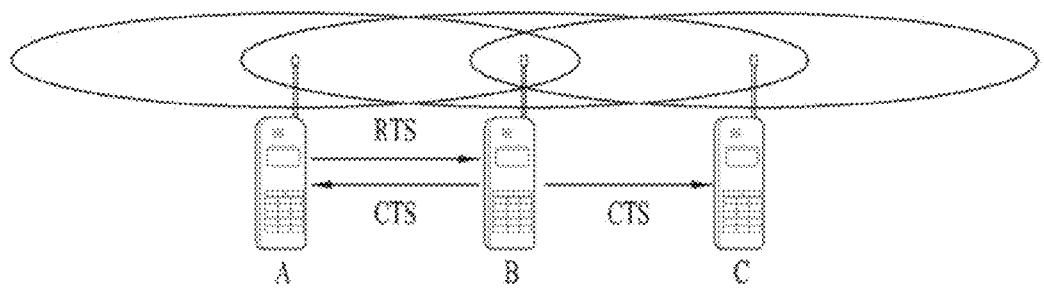
FIG. 12 is a diagram to describe a mechanism for solving hidden node issues using RTS/CTS frame.

FIG. 12 is a diagram to describe a mechanism for solving hidden node issues using RTS/CTS frame.

Referring to FIG. 12, both STA A and STA C intend to transmit data to STA B. If the STA A transmits RTS to the STA B, the STA B transmits CTS to both of the STA A and STA C located adjacent to the STA B. Consequently, the STA C stands by until both of the STA A and STA B complete data transmission and thus a collision can be avoided.

Figure 13:
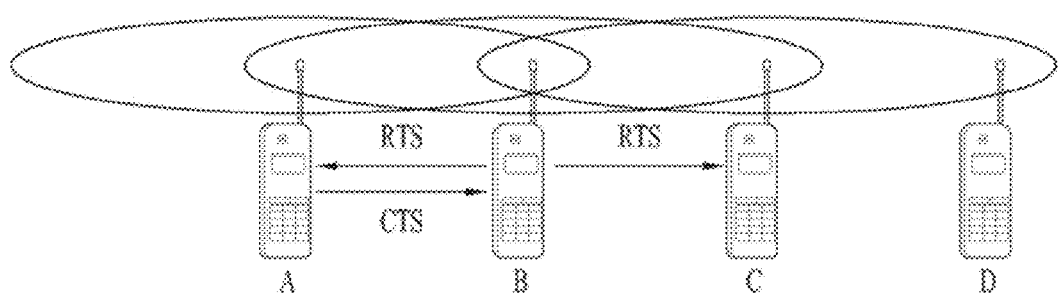
FIG. 13 is a diagram to describe a mechanism for solving exposed node issues using RTS/CTS frame.

FIG. 13 is a diagram to describe a mechanism for solving exposed node issues using RTS/CTS frame.

Referring to FIG. 13, by overhearing RTS/CTS transmission between STA A and STAB, STA C may know that a collision does not occur even if the STA C transmits data to STA D. In particular, the STA B transmits RTS to all neighboring STAs but transmits CTS only to the STA A to which the STA B will actually transmit data. Since the STA C receives RTS except CTS from the STA A, the STA C can recognize that the STA A is out of the CS range of the STA C.

Figure 14:
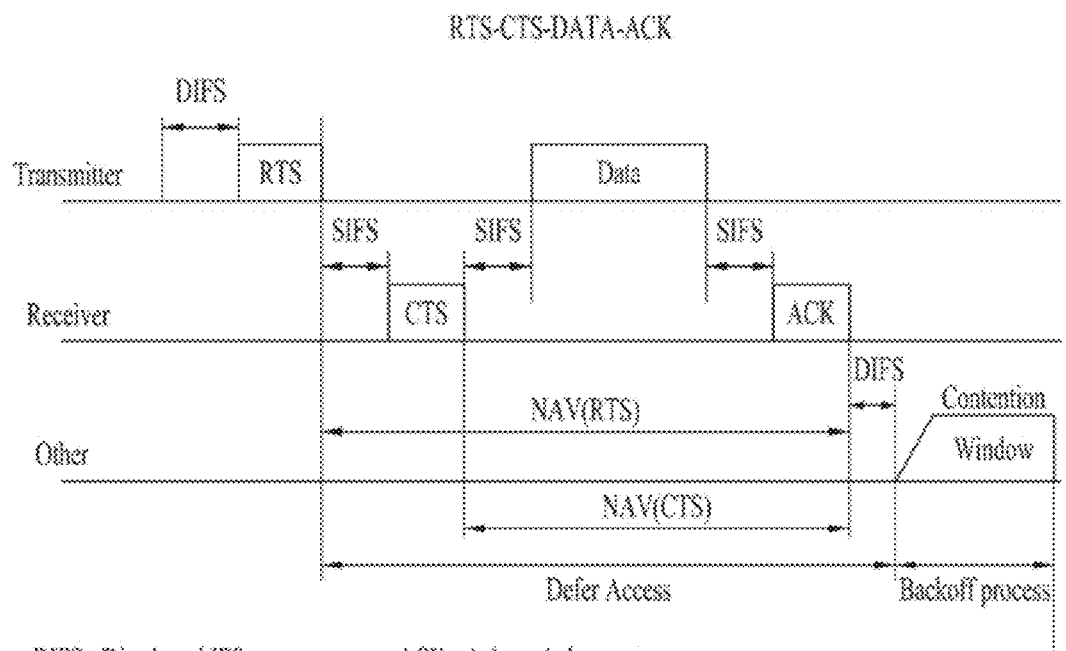
FIG. 14 is a diagram for describing details of an operating method using RTS/CTS frame.

FIG. 14 is a diagram for describing details of an operating method using RTS/CTS frame.

Referring to FIG. 14, after DIFS (distributed IFS), a transmitting STA may transmit an RTS frame to a receiving STA to which the transmitting STA will transmit a signal. Having received the RTS frame, the receiving STA may transmit CTS to the transmitting STA after SIFS (short IFS). After receiving CTS from the receiving STA, the transmitting STA may transmit data after SIFS as shown in FIG. 14. After receiving the data, the receiving STA may transmit ACK response in response to the data received after SIFS.

Meanwhile, among neighboring STAs except the above-mentioned transmitting and receiving STAs, an STA that receives RTS/CTS of the transmitting STA may determine whether a medium is busy or not according to RTS/CTS reception as described above with reference to FIGS. 12 and 13. And, the STA may configure NAV (network allocation vector) based on the medium state. If NAV duration ends, the STA may perform the contention resolution procedure described above with reference to FIG. 9 after DIFS.

Based on the above explanation, the followings are for MU-RTS based UL MU transmission.

The MU-RTS/CTS procedure allows an AP to protect an MU transmission. An HE AP may transmit an MU-RTS frame to solicit simultaneous CTS responses from one or more HE STAs.

Figure 15:
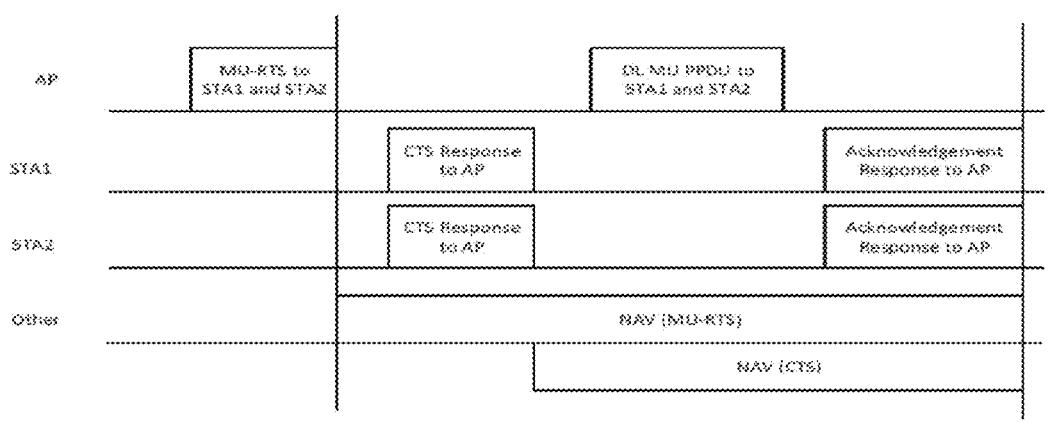
FIG. 15 shows one exemplary MU-RTS/CTS procedure according to one embodiment of the present invention.

FIG. 15 shows one exemplary MU-RTS/CTS procedure according to one embodiment of the present invention.

As shown in FIG. 15, AP may transmit MU-RTS to multiple STAs, such as STA 1 and STA 2. In response to MU-RTS, STA 1 and STA 2 may simultaneously transmit CTS Response to AP. Based on these MU-RTS/CTS frames, the other STA(s) may update its NAV as shown in FIG. 15.

Thereafter, AP may send DL MU PPDU to STA 1 and STA 2. For this DL MU frame, STA 1 and STA 2 may send acknowledgement to the AP.

The UL MU resource allocation of the MU-RTS may be established as the same as the UL MU resource allocation of trigger frame. However, one of the embodiments focuses on the difference in that MU-RTS/CTS is not proper to use OFDMA scheme while trigger based UL MU transmission is performed by using OFDMA scheme.

MU-RTS/CTS is exchanged to avoid the problem as explained with regards to FIGS. 10 to 13. Therefore, it is proposed to establish RU allocation in MU-RTS/CTS procedure based on a unit of 242-tone (20 MHz). Simultaneous CTSs are preferred to be transmitted as duplicate non-HT PPDU format based on this resource allocation.

As stated above with regards to trigger frame, the UL MU scheduling information of trigger frame (first UL MU scheduling information) includes 7 bits indicating allocated RU in unit of 26-tone RU, 52-tone RU, 106-tone RU, 242-tone RU, 484-tone RU and 996-tone RU in 80 MHz, and indicates the allocated RU in 80+80 MHz. However, the UL MU scheduling information of MU-RTS (second UL MU scheduling information) does not require bit pattern to indicate RU in unit of 26/52/106 tones. So, the present embodiment propose to establish the second UL MU scheduling information indicating the allocated channel corresponding to '242*M'-tone RU (M is an integer greater than 0). The second UL MU scheduling information of MU-RTS can be also included in user Info field of MU-RTS.

Two examples fort this embodiment can be considered.

(1) Reusing the Bit Pattern Used for Trigger Frame

In this example, 'N' bit pattern of the second UL MU scheduling information may reuse the bit pattern used for trigger frame. 'N' can be set as the same as 7, but it may be set considering the possible allocation methods for each case.

The RU Allocation subfield in the User Info field addressed to the STA may indicate whether the CTS frame is transmitted on the primary 20 MHz channel, primary 40 MHz channel, primary 80 MHz channel, 160 MHz channel, or 80+80 MHz channel.

B12 of the RU Allocation subfield may be set to 0 for indication of primary 20 MHz, primary 40 MHz channel, and primary 80 MHz channel. For 160 MHz and 80+80 MHz indication, B12 of the RU Allocation subfield may be set to 1.

In detailed example, if the BW subfield indicates 20 MHz, then the primary 20 MHz channel is indicated by setting B19-B13 of the RU Allocation subfield to 0111101. Here, the primary 20 MHz channel is the 20 MHz channel corresponding to 242-tone RU1 [−122: −2, 2: 122].

If the BW subfield indicates 40 MHz, then the primary 20 MHz channel is indicated by setting B19-B13 of the RU Allocation subfield to 0111101 when the primary 20 MHz channel is the lowest frequency 20 MHz channel and 0111110 when the primary 20 MHz channel is the second lowest frequency 20 MHz channel. Here, the lowest frequency 20 MHz channel is the 20 MHz channel corresponding to 242-tone RU1 [−244: −3] and the second lowest frequency 20 MHz channel is the 20 MHz channel corresponding to 242-tone RU2 [3: 244].

The primary 40 MHz channel is indicated by setting B19-B13 of the RU Allocation subfield to 1000001. Here, the primary 40 MHz channel is the 40 MHz channel corresponding to 484-tone RU1 [−244: −3, 3: 244].

If the BW subfield indicates 80 MHz or 80+80 MHz or 160 MHz, then the primary 20 MHz channel is indicated by setting B19-B13 of the RU Allocation subfield to 0111101 when the primary 20 MHz channel is the lowest frequency 20 MHz channel in the primary 80 MHz channel, 0111110 when the primary 20 MHz channel is the second lowest frequency 20 MHz channel in the primary 80 MHz, 0111111 when the primary 20 MHz channel is the third lowest frequency 20 MHz channel in the primary 80 MHz, and 1000000 when the primary 20 MHz channel is the fourth lowest frequency 20 MHz channel in the primary 80 MHz. Here, the lowest frequency 20 MHz channel is the 20 MHz channel corresponding to 242-tone RU1 [−500: −259] and the second lowest frequency 20 MHz channel is the 20 MHz channel corresponding to 242-tone RU2 [−258: −17], the third lowest frequency 20 MHz channel is the 20 MHz channel corresponding to 242-tone RU3 [17: 258] and the fourth lowest frequency 20 MHz channel is the 20 MHz channel corresponding to 242-tone RU4 [259: 500].

B19-B13 are 1000001 indicates 484-tone RU1 [−500: −17], 1000010 indicates 484-tone RU2 [17: 500]. B19-B13 are 1000011 indicates 996-tone RU1 [−500: −3, 3: 500].

The primary 40 MHz channel is indicated by setting B19-B13 of the RU Allocation subfield to 1000001 when the primary 40 MHz channel is the lowest frequency 40 MHz channel in the primary 80 MHz channel and 1000010 when the primary 40 MHz channel is the second lowest frequency 40 MHz channel in the primary 80 MHz channel. Here, the lowest frequency 40 MHz channel is the 40 MHz channel corresponding to 484-tone RU1 [−500: −17] and the second lowest frequency 40 MHz channel is the 40 MHz channel corresponding to 484-tone RU2 [17: 500].

The primary 80 MHz channel is indicated by setting B19-B13 of the RU Allocation subfield to 1000011. Here, the primary 80 MHz channel is the 80 MHz channel corresponding to 996-tone RU1 [−500: −3, 3: 500]

If the BW subfield indicates 80+80 MHz or 160 MHz, then the primary and secondary 80 MHz is indicated by setting B19-B13 of the RU Allocation subfield to 1000100.

(2) Defining New Bit Pattern as Separate from Those for Trigger Frame

As another example, the second UL MU scheduling information of MU-RTS may be established as separate from those of trigger frame. Table 4 is one example.

TABLE 4

| 7 bits indices | Message | Number of entries |
|---|---|---|
| 0000000~0100100 | Possible 26 RU cases in 80 MHz | 37* |
| 0100101~0110100 | Possible 52 RU cases in 80 MHz | 16 |
| 0110101~0111100 | Possible 106 RU cases in 80 MHz | 8 |
| 0111101~1000000 | Possible 242 RU cases in 80 MHz | 4 |
| 1000001~1000010 | Possible 484 RU cases in 80 MHz | 2 |
| 1000011 | Possible 996 RU cases in 80 MHz | 1 |
| 1000100 | 160 MHz/80 + 80 MHz case | 1 |
| 1000101, 1000110, 1000111, 1001000 | Possible 20 MHz subchannel cases in 80 MHz | 4 |
| 1001001, 1001010 | Possible 40 MHz subchannel cases in 80 MHz | 2 |
| 1001011 | Possible 80 MHz subchannel cases in 80 MHz | 1 |
| Total | | 69 + 7 |

Figure 16:
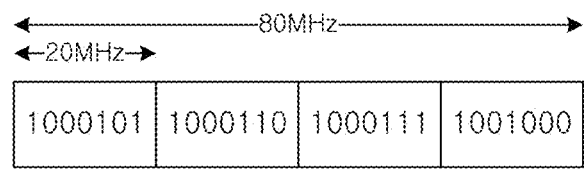
FIGS. 16-18 are for explaining number of entries based on the size of channel used for MU-RTS/CTS according to one example of the present invention.
Figure 17:
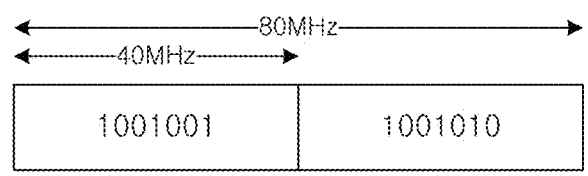
Figure 18:
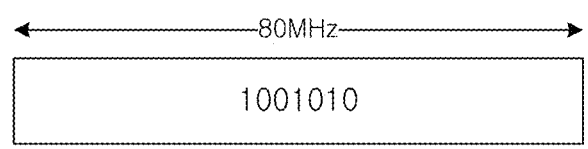

FIGS. 16-18 are for explaining number of entries based on the size of channel used for MU-RTS/CTS according to one example of the present invention.

As shown in FIG. 16, when 20 MHz (sub-)channel is used in 80 MHz BW, there can be 4 different entries represented by using 1000101~1001000.

As shown in FIG. 17, when 40 MHz (sub-)channel is used in 80 MHz BW, there can be 2 different entries represented by using 1001001 and 1001010.

As shown in FIG. 18, when 80 MHz (sub-)channel is used in 80 MHz BW, there can be only one entry represented by using 1001010.

Additionally, the UL RU can be allocated as non-contiguous channels including primary channel.

Figure 19:
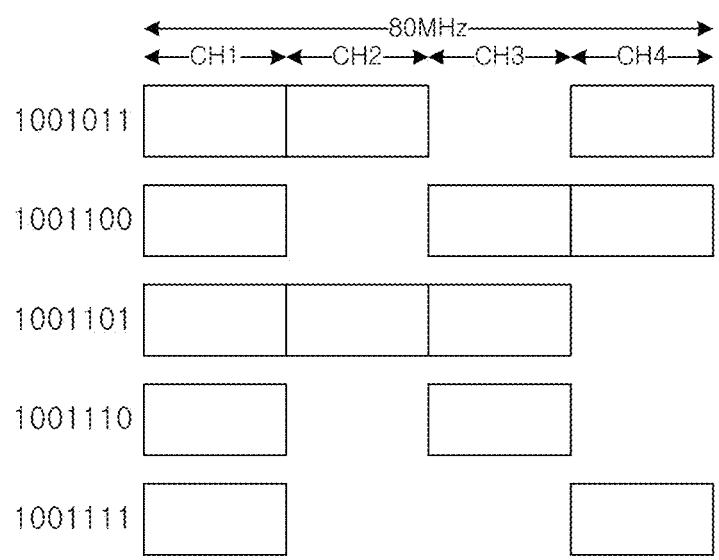
FIGS. 19 and 20 are for explaining possible non-contiguous channel allocation by MU-RTS according to one example of the present invention.
Figure 20:
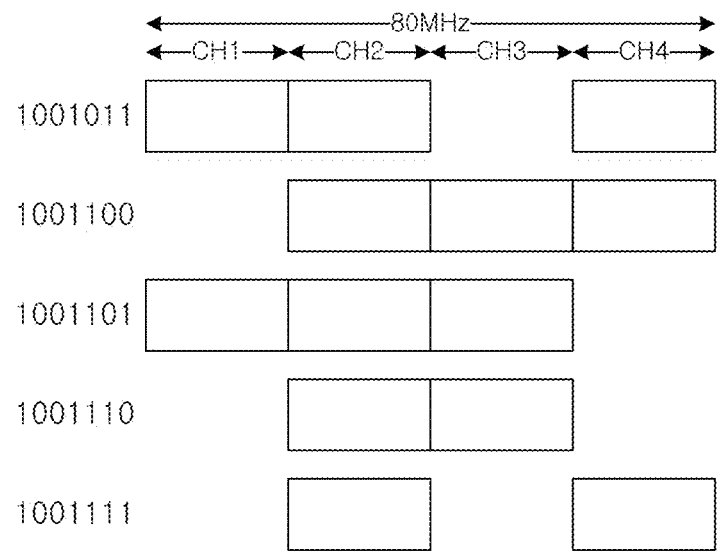

FIGS. 19 and 20 are for explaining possible non-contiguous channel allocation by MU-RTS according to one example of the present invention.

In FIG. 19, 1001011 indicates CH 1, 2, 4 are allocated in 80 MHz BW. 1001100 indicates CH 1, 3, 4 are allocated. Likewise each bit pattern may indicate multiple channels allocated. These channels may be continuous or non-continuous as shown in FIG. 19. STA may transmit CTS by using duplicated non-HT PPDU.

FIG. 19 is an example supposing CH 1 is the primary channel. However, the location of primary channel may be changed, and FIG. 20 shows this example.

Figure 21:
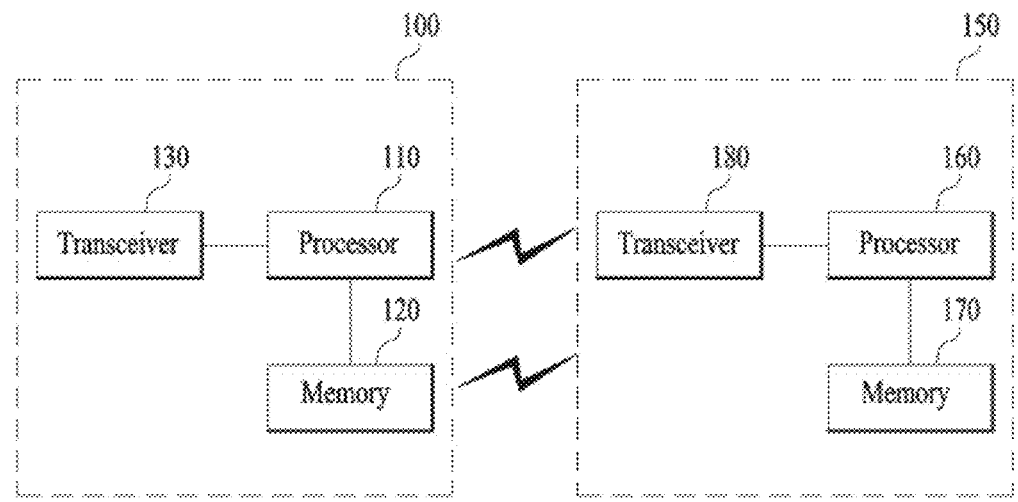
FIG. 21 is a block diagram of apparatuses for performing the above-described methods.

In FIG. 20, CH 2 is supposed as primary channel. Thus, continuous/non-continuous allocation of channels shall include CH 2, the primary channel as shown in FIG. 21.

Based on these, the second UL MU scheduling information may include following bit pattern.

TABLE 5

| 7 bits indices | Message | Number of entries |
|---|---|---|
| 0000000~0100100 | Possible 26 RU cases in 80 MHz | 37* |
| 0100101~0110100 | Possible 52 RU cases in 80 MHz | 16 |
| 0110101~0111100 | Possible 106 RU cases in 80 MHz | 8 |
| 0111101~1000000 | Possible 242 RU cases in 80 MHz | 4 |
| 1000001~1000010 | Possible 484 RU cases in 80 MHz | 2 |
| 1000011 | Possible 996 RU cases in 80 MHz | 1 |
| 1000100 | 160 MHz/80 + 80 MHz case | 1 |

TABLE 5-continued

| 7 bits indices | Message | Number of entries |
|---|---|---|
| 1000101, 1000110, 1000111, 1001000 | Possible 20 MHz subchannel cases in 80 MHz (See FIG. 16) | 4 |
| 1001001, 1001010 | Possible 40 MHz subchannel cases in 80 MHz (See FIG. 17) | 2 |
| 1001011 | Possible 80 MHz subchannel cases in 80 MHz (See FIG. 18) | 1 |
| 1001011, 1001100, 1001101, 1001110, 1001111 | Possible non-contiguous subchannel allocation cases in 80 MHz (See FIG. 19 | 3 |
| Total | | 69 + 9 |

FIG. 21 is a block diagram of apparatuses for performing the above-described methods.

Referring to FIG. 21, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing SR operation.

The processors 110 and 160 and/or the transceivers 130 and 180 may include Application-Specific Integrated Circuit (ASICs), other chip sets, logic circuits, and/or data processors. The memories 120 and 170 may include Read Only Memories (ROMs), Random Access Memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, control information can be efficiently transmitted in a multi-user radio frame.

While the present invention has been described above in the context of an IEEE 802.11 WLAN system, the present invention is not limited thereto. The present invention is applicable in the same manner to various wireless systems in which an AP may transmit a frame including control information for a plurality of STAs.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for an access point (AP) to transmit uplink multi-user (UL MU) scheduling information to multiple stations (STAs) in a wireless local area network (WLAN), the method comprising:
   transmitting a multi-user request-to-send (MU-RTS) frame including first UL MU scheduling information to the multiple STAs, wherein the first UL MU scheduling information is used for a channel allocation corresponding to '242*M'-tone resource unit (RU), wherein 'M' is an integer greater than 0;
   receiving one or more clear to send (CTS) frames from the multiple STAs based on the first UL MU scheduling information;
   transmitting a trigger frame including second UL MU scheduling information to the multiple STAs, wherein the second UL MU scheduling information is used for RU allocation in unit of 26-tone RU, 52-tone RU, 106-tone RU, 242-tone RU, 484-tone RU and 996-tone RU in 80 MHz, and for RU allocation in 80+80 MHz; and
   receiving one or more trigger-based Physical Protocol Data Units (PPDUs) from the multiple STAs based on the second UL MU scheduling information,
   wherein a first number of available sizes of RU used for the first UL MU scheduling information of the MU-RTS frame is smaller than a second number of available sizes of RU used for the second UL MU scheduling information of the trigger frame.

2. The method of claim 1, wherein the MU-RTS is transmitted to the multiple STAs soliciting simultaneous CTS frames from the multiple STAs.

3. The method of claim 1, wherein second bit values of the second UL MU scheduling information used for the RU allocation in a unit equal to or greater than 242-tone RU include first bit values of the first UL MU scheduling information used for the channel allocation corresponding to '242*M'-tone RU.

4. The method of claim 1,
   wherein the second UL MU scheduling information includes a first bit indicating whether allocated RU is located in a primary 80 MHz or non-primary 80 MHz, and N bits subsequent to the first bit, and
   wherein N is larger than 1.

5. The method of claim 4, wherein a length of the N bits of the second UL MU scheduling information is 7 bits.

6. The method of claim 5, wherein the first UL MU scheduling information indicates 4 different allocated channels corresponding to 242-tone RU with a same bit pattern as the N bits of the second UL MU scheduling information.

7. The method of claim 5, wherein the first UL MU scheduling information indicates 2 different allocated channels corresponding to 484-tone RU with a same bit pattern as the N bits of the second UL MU scheduling information.

8. The method of claim 1, wherein the first UL MU scheduling information further indicates a location of a primary channel in a frequency domain.

9. The method of claim 1, wherein the first and the second UL MU scheduling information are included in user-information fields of the MU-RTS frame and the trigger frame, respectively.

10. A method for a station (STA) to transmit uplink multi-user (UL MU) signal to an access point (AP) in a wireless local area network (WLAN), the method comprising:
    receiving a multi-user request-to-send (MU-RTS) frame including first UL MU scheduling information, wherein the first UL MU scheduling information indicates an is used for a channel allocation corresponding to '242*M'-tone resource unit (RU), wherein 'M' is an integer greater than 0;
    transmitting a clear to send (CTS) frame based on the first UL MU scheduling information;
    receiving a trigger frame including second UL MU scheduling information, wherein the second UL MU scheduling information is used for RU allocation in unit of 26-tone RU, 52-tone RU, 106-tone RU, 242-tone RU, 484-tone RU and 996-tone RU in 80 MHz, and for RU allocation in 80+80 MHz; and
    transmitting a trigger-based PPDU (Physical Protocol Data Unit) based on the second UL MU scheduling information,
    wherein a first number of available sizes of RU used for the first UL MU scheduling information of the MU-RTS frame is smaller than a second number of available sizes of RU used for the second UL MU scheduling information of the trigger frame.

11. An Access Point (AP) transmitting uplink multi-user (UL MU) scheduling information to multiple stations (STAs) in a wireless local area network (WLAN), the AP comprising:
    a transceiver configured to transmit a trigger frame including first UL MU scheduling information and a multi-user request-to-send (MU-RTS) frame including second UL MU scheduling information to the multiple STAs, and to receive one or more trigger-based PPDUs (Physical Protocol Data Units) based on the first UL MU scheduling information and one or more clear to send (CTS) frames based on the second UL MU scheduling information from the multiple STAs; and
    a processor configured to prepare the first and the second UL MU scheduling information,
    wherein the first UL MU scheduling information includes is used for resource unit (RU) allocation in unit of 26-tone RU, 52-tone RU, 106-tone RU, 242-tone RU, 484-tone RU and 996-tone RU in 80 MHz, and for RU allocation in 80+80 MHz,
    wherein the second UL MU scheduling information is used for channel allocation corresponding to '242*M'-tone RU,
    wherein 'M' is an integer greater than 0, and
    wherein a second number of available sizes of RU used for the second UL MU scheduling information of the MU-RTS frame is smaller than a first number of available sizes of RU used for the first UL MU scheduling information of the trigger frame.

12. A station (STA) transmitting uplink multi-user (UL MU) signal to an access point (AP) in a wireless local area network (WLAN), the STA comprising:
    a transceiver configured to receive a trigger frame including first uplink multi-user (UL MU) scheduling information and a multi-user request-to-send (MU-RTS) frame including second UL MU scheduling information from the AP, and to transmit a trigger-based PPDU (Physical Protocol Data Unit) based on the first UL MU scheduling information and a clear to send (CTS) frame based on the second UL MU scheduling information; and
    a processor configured to process the first and the second UL MU scheduling information,
    wherein the first UL MU scheduling information is used for resource unit (RU) allocation in unit of 26-tone RU, 52-tone RU, 106-tone RU, 242-tone RU, 484-tone RU and 996-tone RU in 80 MHz, and for RU allocation in 80+80 MHz, wherein the second UL MU scheduling information is used for channel allocation corresponding to '242*M'-tone RU, wherein 'M' is an integer greater than 0, and wherein a second number of available sizes of RU used for the second UL MU scheduling information of the MU-RTS frame is smaller than a first number of available sizes of RU used for the first UL MU scheduling information of the trigger frame.

* * * * *

UNITED STATES PATENT AND TRADEMARK OFFICE
CERTIFICATE OF CORRECTION

Page 1 of 1

PATENT NO. : 10,362,606 B2
APPLICATION NO. : 15/491912
DATED : July 23, 2019
INVENTOR(S) : Jeongki Kim, Kiseon Ryu and Hangyu Cho It is certified that error appears in the above-identified patent and that said Letters Patent is hereby corrected as shown below:

In the Claims

Column 16, Line 1, delete the words "indicates an";
Line 38, delete the word "includes".

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*